United States Patent [19]

Miki et al.

[11] Patent Number: 4,735,286

[45] Date of Patent: Apr. 5, 1988

[54] DETECTOR FOR DETECTING MALFUNCTION OF LUBRICATING OIL FEEDER

[75] Inventors: Toshio Miki; Yasuo Ichikawa; Satosi Ogawa, all of Osaka, Japan

[73] Assignee: Koyo Seiko Co., Ltd., Osaka, Japan

[21] Appl. No.: 854,131

[22] Filed: Apr. 21, 1986

[30] Foreign Application Priority Data

| Apr. 19, 1985 | [JP] | Japan | 60-85035 |
| Apr. 19, 1985 | [JP] | Japan | 60-85036 |
| Nov. 20, 1985 | [JP] | Japan | 60-262141 |
| Dec. 28, 1985 | [JP] | Japan | 60-299392 |
| Dec. 28, 1985 | [JP] | Japan | 60-299393 |
| Dec. 28, 1985 | [JP] | Japan | 60-299394 |

[51] Int. Cl.$^4$ .................. F01M 1/18; F16N 5/00
[52] U.S. Cl. .................. 184/64; 184/39.1; 184/108; 184/55.1
[58] Field of Search .......... 184/6.4, 39.1, 55.1, 184/55.2, 58, 108

[56] References Cited

U.S. PATENT DOCUMENTS

| 3,618,709 | 11/1971 | Boelkins | 184/6.4 |
| 4,262,775 | 4/1981 | Webb | 184/6.4 |
| 4,284,174 | 8/1981 | Salvana | 184/6.4 |

FOREIGN PATENT DOCUMENTS 146792 2/1983 Japan.

Primary Examiner—Carlton R. Croyle
Assistant Examiner—Jane E. Obee
Attorney, Agent, or Firm—Finnegan, Henderson, Farabow, Garrett and Dunner

[57] ABSTRACT

A lubricating oil feeder for supplying an air-oil mixture containing compressed air and lubricating oil to oil receiving units including a pump for generating compressed air, an air supply pipe coupled to the pump, air induction pipes for introducing the compressed air from the pump in the oil receiving units, and oil supply source for intermittently discharging lubricating oil from the intermittent oil supply source to the oil receiving units, and oil injection devices for intermittently supplying a small fixed quantity of lubricating oil from the intermittent oil supply source to the lubricating oil supply pipes. The oil injection devices are installed between the intermittent oil supply source and the lubricating oil supply pipes, and the oil lines are coupled to the air induction pipes through the lubricating oil supply pipes and check valves. A detector detects a malfunction of the lubricating oil feeder and includes first throttle valves between the air supply pipe and the air induction pipes, second throttle valves between the air induction pipes and the oil lines, and third throttle valves at the front ends of the air induction pipes so as to set the internal pressures of the air induction pipes higher than the atmospheric pressure and lower than the internal pressure of the air supply pipe and to set the internal pressure of the oil lines equal to the internal pressures of the lubricating oil supply pipes. A malfunction is detected using pressure detecting means when the internal pressures of the oil lines set up by the first, second, and third throttle valves deviate from set values.

6 Claims, 11 Drawing Sheets

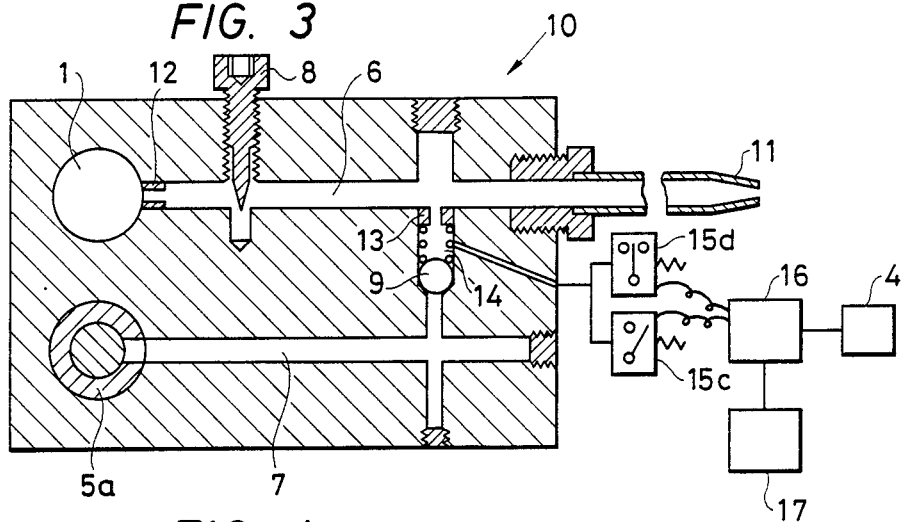
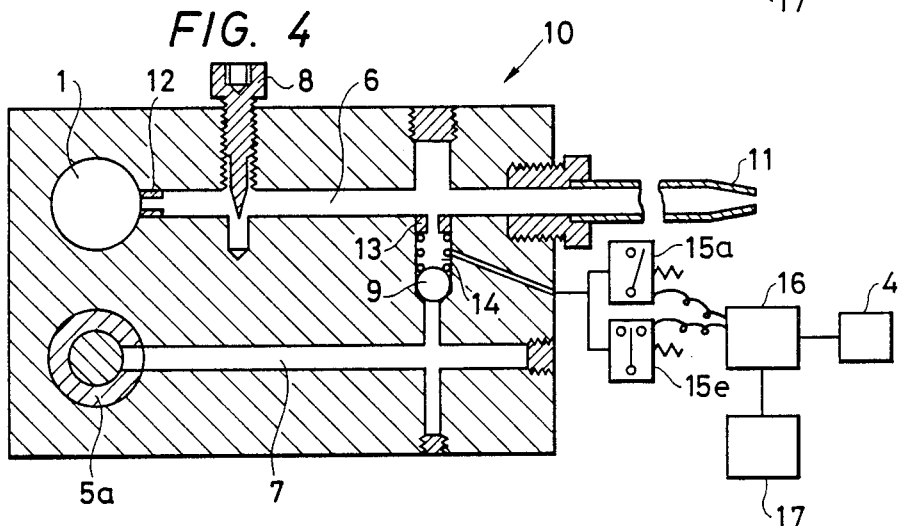
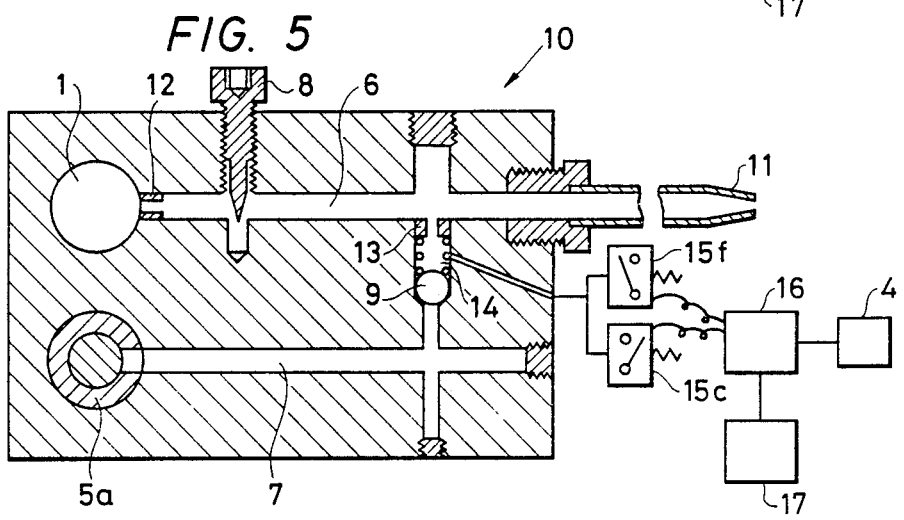

DETECTOR FOR DETECTING MALFUNCTION OF LUBRICATING OIL FEEDER

FIELD OF THE INVENTION

This invention relates to a method for detecting the malfunction of the lubricating oil feeder for supplying lubricating oil to bearings rotated at high speed such as those used for spindles of machine tools.

BACKGROUND OF THE INVENTION

There is known a lubricating oil feeder of the sort disclosed in Japanese Patent Application (OPI) 146792/83. The following discussion of a known lubricating oil feeder, shown in modified form in FIG. 13, will be described using both the reference letters of FIG. 13 and the reference numbers of the Japanese Patent Application shown in parenthesis next to like parts. As shown in FIG. 13 hereof, the known lubricating oil feeder comprises an oil receiving unit a such as a bearing, air supply means b(2) connected to the oil receiving unit a through air supply pipes c, c'(3), and a bypass d(4) branching off from the air supply pipe c(3) and coupled to the air supply pipe c'(3) located nearby the oil receiving unit a(1). The bypass d(4) is equipped with an on-off valve e(5) intermittently turned on and off, an oil injection device h(7) having an oil supply source g, (6) and a mixing valve j(8). Such a lubricating oil feeder is designed to supply oil and air simultaneously to the oil receiving unit a(1) by controlling the operation of the on-off valve e(5) using a controller f(5a). In this manner, a small, fixed quantity of lubricating oil is intermittently discharged into the air supply pipe c'(3) and is carried to the oil receiving unit a(1) with the aid of an air flow. Reference character k(8a) denotes a check valve and characters m and n identify pressure gauges, not shown in the Japanese Patent Application.

A suitable quantity of non-misty lubricating oil is thus always continuously carried to the oil receiving unit a with the aid of the compressed air flow and, because the compressed air itself contributes to cooling the oil receiving unit a, the oil receiving unit a is kept in optimum rotational condition.

This conventional method of supplying lubricating oil makes it essential to ensure the presence of a supply of lubricating oil because the quantity of oil supplied at one time to the oil receiving unit a is extremely small. There actually have arisen cases, however, where the oil supply may become unsteady because of irregularities caused by a clogged nozzle at the tip of the air supply pipe c, valve trouble, or damage to the piping.

In order to guard against such irregularities, pressure gauges m, n are attached to the air supply pipe c and the bypass d, respectively, in locations nearby the air supply source b so that the irregularities may be detected by monitoring pointer movement. Nevertheless, there are still several problems. For example, whether or not the oil injection device h is effectively operating to cause a fixed quantity of lubricating oil to be discharged intermittently and regularly will not be detected in the location where the pressure gauge n is installed and correct data concerning the supply of lubricating oil to the oil receiving unit will also not be obtained. Also, lubricating oil is supplied to a plurality of units simultaneously and, for this reason, the air supply pipe c is equipped with branch pipes. Each branch pipe is provided with the bypass d having the oil injection device h attached thereto. The mixing valve j is arranged at the juncture of the bypass d and the air supply pipe c. In such a case, because the branch pipes are installed in parallel with each other, the pressure in the air supply pipe c will change only slightly if some problem occurs at one point in the air supply pipe c. The irregular oil supply to each oil receiving unit a is accordingly undetectable by monitoring pressure changes in the air supply pipe c through the pressure gauge m.

OBJECTS AND SUMMARY OF THE INVENTION

An object of the present invention is to provide a detector that accurately and effectively detects malfunctions in a lubricating oil feeder.

Another object of the present invention is to provide a detector for identifying the specific locations of malfunctions in a lubricating oil feeder.

A further object of the present invention is to provide a detector for monitoring the supply of oil and compressed air within a lubricating oil feeder.

These and other objects are accomplished by an oil supply malfunction detector for use in a lubricating oil feeder for supplying a mixture of oil and air to lubricate an oil receiving unit wherein the feeder includes a source of compressed air, an air supply pipe connected to the source, an oil supply source for intermittently discharging lubricating oil, an oil injection device for receiving the oil and for intermittently discharging a fixed quantity of oil to an oil supply pipe, a mixing valve connected to the air supply pipe and the oil supply pipe to mix the compressed air and oil, and an oil receiving unit connected to the mixing valve for receiving the mixture of air and oil, the detector comprising a first pressure detector for generating a first signal having a valve corresponding to the difference in pressure between the oil discharged by the oil injection device and the oil supplied by the oil supply means, a second pressure detector for generating a second signal having a valve corresponding to the air pressure between the source of compressed air and the mixing valve, a third pressure detector for generating a third signal having a value corresponding to the pressure of the mixture of air and oil supplied to the oil receiving unit, and an error detector device for comparing the values of the first, second, and third signals to predetermined normal values and for indicating the existence and location of a malfunction in the oil feeder in response to the difference in the compared signals exceeding a preselected range of differences.

BRIEF DESCRIPTION OF THE DRAWINGS

The manner by which the above objects and other objects, features, and advantages of the present invention are attained will become fully apparent from the following detailed description when it is considered in view of the drawings, wherein:

FIGS. 3, 4 and 5 are schematic sectional views of other embodiments of mixers that can be used in the detector of FIG. 1;

DETAILED DESCRIPTION

Figure 1:
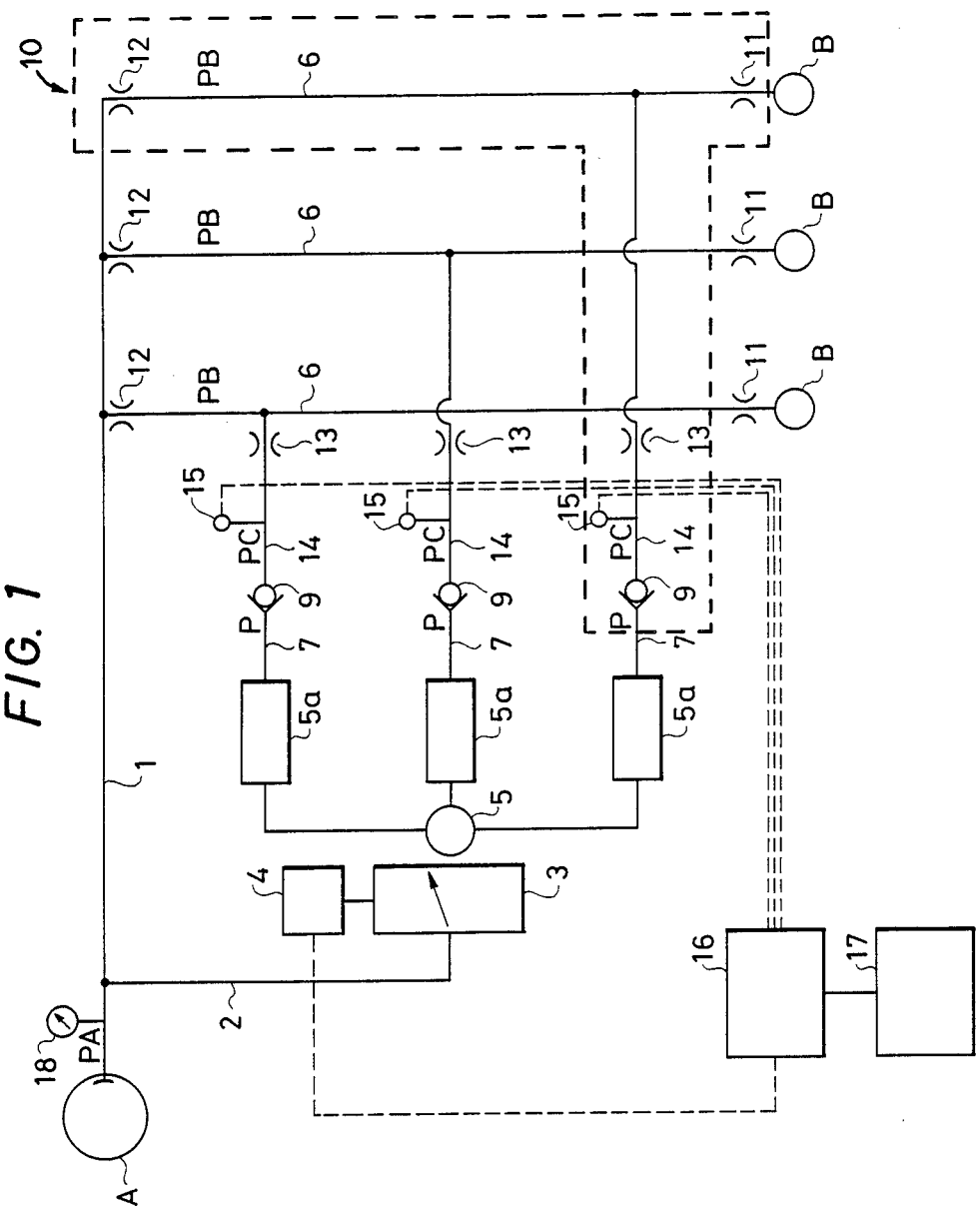
FIG. 1 is a block system diagram of an embodiment of the detector of the present invention.

As shown in FIG. 1, a lubricating oil feeder for supplying an air-oil mixture of compressed air and lubricating oil to oil receiving units B comprises a pump A for generating compressed air, an air supply pipe 1 coupled to the pump A, air induction pipes 6 for introducing compressed air from the pump A to the oil receiving unit B, an oil supply source 5 for intermittently discharging lubricating oil, lubricating oil supply pipes 7 for introducing the lubricating oil from the intermittent oil supply source 5 in the oil receiving units B, and oil injection devices 5a for intermittently supplying a small fixed quantity of lubricating oil from the intermittent oil supply source 5 to the lubricating oil supply oil pipes 7. The oil injection devices 5a are installed at the joints between the intermittent oil supply source 5 and the lubricating oil supply pipes 7. Oil lines 14 are coupled to the air induction pipes 6 leading to the oil receiving units B and to the lubricating oil supply pipes 7 through check valves 9.

In order to detect the malfunction of the lubricating oil feeder, first throttle valves 12 are installed at the joints between the air supply pipe 1 and the air induction pipes 6. Second throttle valves 13 are produced between the air induction pipes 6 and the oil lines 14. Third throttle valves 11 are installed at the front ends of the air induction pipes 6 so as to set the internal pressures PB of the air induction pipes 6 higher than atmospheric pressure and lower than the internal pressure PA of the air supply pipe 1 by means of the first and third throttle valves 12, 11. The internal pressures PO of the oil lines 14 are made equal to the internal pressures P of the lubricating oil supply pipes 7 while lubricating oil is being discharged from the lubricating oil supply pipes 7 into the oil lines 14 as the check valve 9 is opened by the second throttle valve 13. Any malfunction is detected by pressure detecting means 15 when the internal pressure PC of the oil lines 14 set by the throttle valves 11, 12, 13 deviates from set values.

Figure 6:
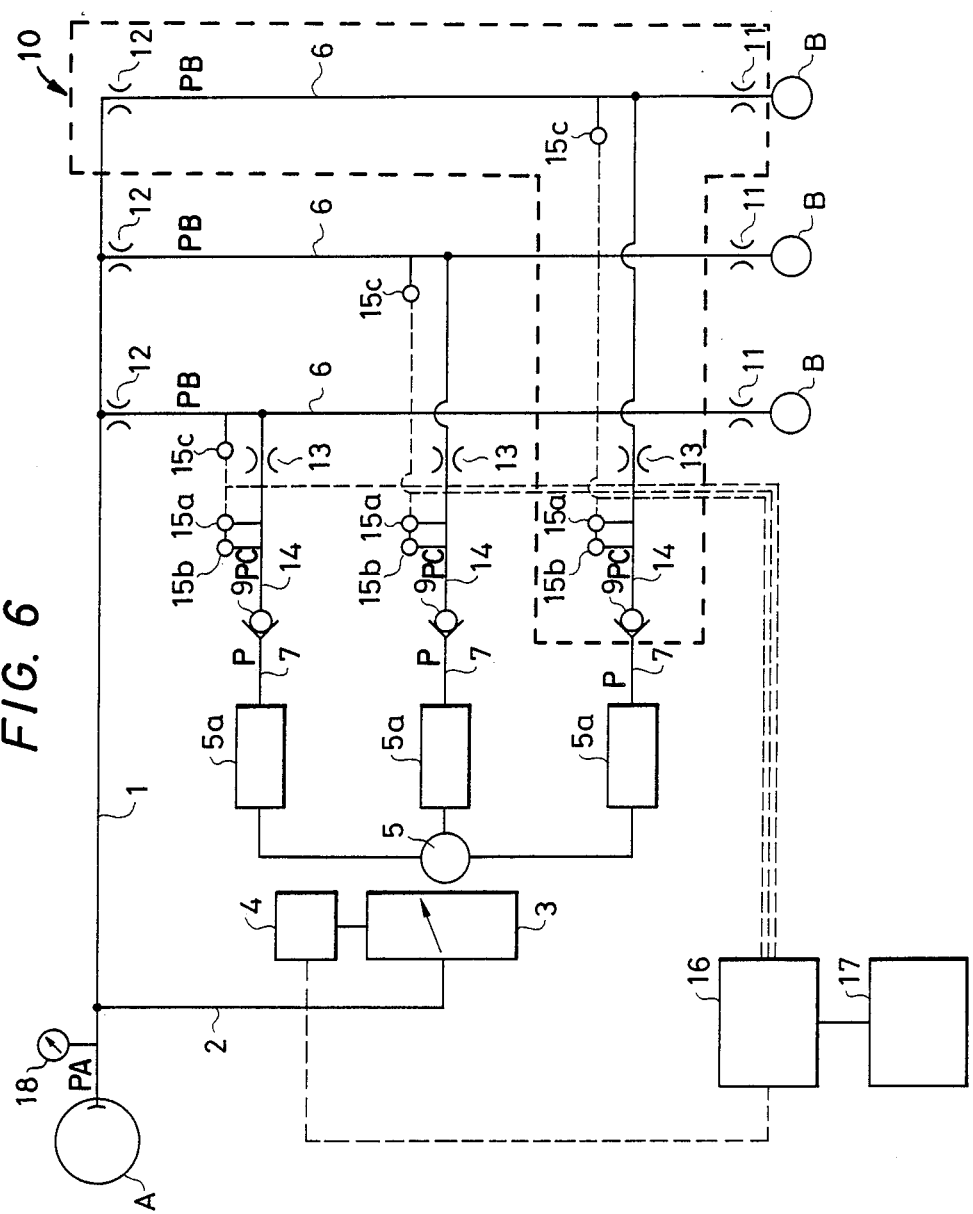
FIG. 6 is a block system diagram of another embodiment of the detector of the present invention.

FIG. 6 shows another embodiment of a lubricating oil feeder for supplying an air-oil mixture containing compressed air and lubricating oil to oil receiving units B. The lubricating oil feeder comprises a pump A for generating compressed air, an air supply pipe 1 coupled to the pump A, air induction pipes 6 for introducing the compressed air from the pump A to the oil receiving units B, an oil supply source 5 for intermittently discharging lubricating oil, lubricating oil supply pipes 7, and oil injection devices 5a for intermittently supplying a small fixed quantity of lubricating oil to supply pipes 7. The oil injection devices 5a are installed between the intermittent oil supply source 5 and the lubricating oil supply pipes 7, and oil lines 14 are coupled to the air induction pipes 6 through the lubricating oil supply pipes 7 and check valves 9.

As shown in FIG. 6, first throttle valves 12 are installed between the air supply pipe 1 and the air induction pipes 6, second throttle valves 13 are provided between the air induction pipes 6 and the oil lines 14, and third throttle valves 11 are located at the front ends of the air induction pipes 6 to set the internal pressures PB of the air induction pipes 6 higher than the atmospheric pressure and lower than the internal pressure PA of the air supply pipe 1. The internal pressures PO of the oil lines 14 is made equal to the internal pressures P of the lubricating oil supply pipes 7 while the lubricating oil is being discharged from the lubricating oil supply pipes 7 into the oil lines 14 as the check valve 9 is opened by the second throttle valve 13. Any malfunction is detected using pressure detecting means 15 when the internal pressures PB, PC of the air induction pipes 6 and the oil lines 14, respectively set up by the throttle valves 11, 12, 13 deviate from set values.

Figure 11:
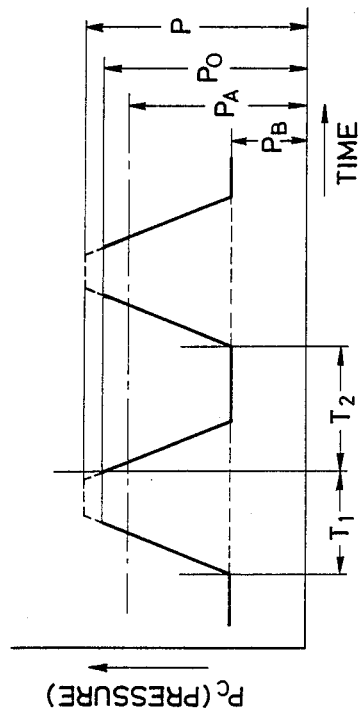
FIGS. 11, 12 are timing diagrams illustrating internal pressures of oil lines in the above-described embodiments of the detector of the present invention.

FIG. 11 illustrates the relation between oil pressure and time in each oil line. Referring now to FIGS. 1, 6, and 11, the functions of the lubricating oil feeder according to the present invention will be described.

The internal pressure PB of the air induction Pipe 6 can be set lower than the internal pressure PA of the air supply Pipe 1 and higher than the atmospheric pressure by means of the first and third throttle valves 12, 11. The internal pressure PC of the oil line 14 is set roughly equal to the internal pressure P of the lubricating oil supply pipe 7 when lubricating oil is being discharged (time T1) as the check valve 9 is opened by the second throttle valve 13 and to the internal pressure PB of the air induction pipe 6 when lubricating oil is not being discharged (time T2) when the check valve 9 is shut.

FIG. 11 shows changes in the internal pressure PC of the oil line 14 during normal operation.

The following irregularities will cause the pressure PB and PC to fluctuate as described below.

If the air induction pipe 6 is damaged, the internal pressure PB of the pipe 6 will decrease. As aforementioned, the internal pressure PC of the oil line 14 in the time period T2 is equal to PB, i.e., the pressure of the air induction pipe 6. If the pressure PB or PC becomes lower than what is expected during normal operation while the internal pressure PB of the air induction pipe 6 or PC of the oil line 14 is monitored, an irregularity is considered to be present.

The throttling function of the first throttle valve 12 will be nullified if the third throttle valve 11 is clogged with an extraneous substance, whereby the internal pressure of the air induction pipe 6 will rise and become close to PA, the pressure of the air supply pipe 1. As in the case described above, the internal pressure PC of the oil line 14 becomes equal to the pressure PB of the air induction pipe 6 in the time zone T2. If the pressure PB or PC becomes higher than the pressure PB during normal operation in the time zone T2, an irregularity is considered to have occurred.

Oil distribution from the oil supply pipe 7 to the oil line 14 will be interrupted if the check valve 9 becomes clogged with an extraneous substance. This will also cause the throttling function of the second throttle valve 13 to be nullified. The internal pressure PC of the oil line 14 will not rise to PO, but will approach the internal pressure PB of the air induction pipe 6 even in the time zone T1.

The lubricating oil discharge pressure in the oil line 14 will remain even during the time zone T2 if the second throttle valve 13 is clogged with an extraneous substance. Thus, the internal pressure of the oil line 14 will not decrease to the pressure PB of the air induction pipe 6.

The internal pressures PO and PB of the oil line 14 and the air induction pipe 6, respectively, as represented when the lubricating oil is being discharged during the normal operation of the lubricating oil feeder, are treated as objective criteria for proper operation. Irregularities are substantiated by detecting changes in the internal pressure PC of the oil line 14 or the pressures PB and PC of the air induction pipe 6 and the oil line 14, respectively.

Referring to the construction of a lubricating oil feeder for use in the present invention, embodiments thereof will be described. With reference again to FIG. 1, the air supply pipe 1 is coupled to the pump A for generating compressed air and branches off therefrom so as to form the air induction pipes 6 (referred to as branch pipes 6 in this embodiment) on the downstream side thereof. The branch pipes 6 terminate at corresponding oil receiving units B. On the upstream side of the branch pipe 6, another air supply pipe 2 branches off from the air supply pipe 1 and the air supply pipe 2 is coupled to the plurality of lubricating oil supply pipes 7 (simply referred to as supply pipes 7 in this embodiment) for supplying lubricating oil. The compressed air generated by the pump A is sent to the oil receiving units B through the air supply pipe 1 and the branch pipes 6.

On the other hand, the compressed air supplied to the air supply pipe 2 is intermittently delivered by an on-off valve 3 under the control of the controller 4 to drive a pump arranged in the intermittent oil supply source 5. The oil supply source intermittently discharges lubricating oil into each oil injection device (quantitative oil discharge means) 5a provided for each supply pipe 7. The lubricating oil intermittently discharged is supplied by each oil injection device 5a to the supply pipe 7 on the downstream side in the form of a small, fixed, intermittent quantity and is discharged into the branch pipe 6 through the check valve 9. The lubricating oil is then changed into an air-oil mixture in the branch pipe 6 and brought to the oil receiving unit B for lubricating purposes.

The intermittent oil supply source 5 comprises a lubricating oil tank and an intermittently driven pump for feeding the lubricating oil. With respect to the type of pump, there may be employed known pumping means other than what is intermittently driven by compressed air as aforementioned, e.g., a hydraulic pump electrically intermittently driven by a timer-driven motor.

Figure 2A:
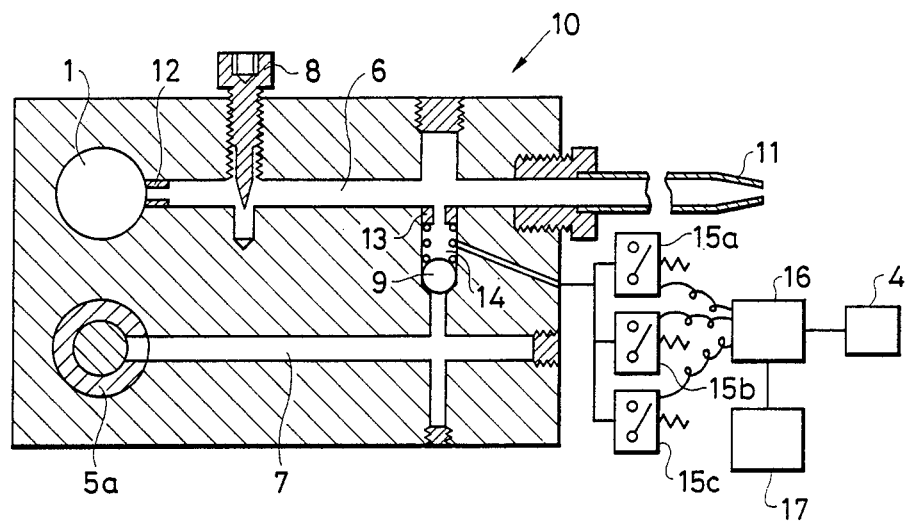
FIG. 2A is a schematic sectional view of a mixer in the detector of FIG. 6.

Each mixing valve (mixer) 10 shown in FIG. 2A comprises a first throttle valve 12 installed at the joint venture between the air supply pipe 1 and the branch pipe 6 branching off therefrom, a variable throttle valve 8 for controlling the flow of the compressed air in the branch pipe 6, the variable throttle valve 8 being installed close to the first throttle valve 12 on its downstream side, a third throttle valve 11 (the injection head of a nozzle 11 also serves at the third throttle valve in this embodiment) installed at the tip of the nozzle, the supply pipe 7 coupled to the oil injection device 5a, a second throttle valve 13 installed at the junction between the supply pipe 7 and the branch pipe 6, the check valve 9 installed in an oil line 14 on the upstream side close to the second throttle valve 13 and pressure detecting means 15 for detecting the internal pressure of the oil line, e.g., a plurality of pressure switches 15a, 15b, and 15c shown in this embodiment of FIGS. 2 and 6. The pressure switches 15a, 15b, and 15c comprise pressure detecting means 15 and are connected to a detector 16 that is connected to the controller 4 and an alarm 17. There is also provided a pressure gauge 18 (FIG. 6).

The first throttle valve 12 and the nozzle 11 are used to set the internal pressure PB of the branch pipe 6 higher than the atmospheric pressure and lower than the internal pressure PA of the air supply pipe 1, whereas the second throttle valve 13 is employed to set the internal pressure PC of the oil line 14 at a pressure of PO roughly equal to the internal pressure P of the supply pipe 7 when the check valve 9 is opened to discharge lubricating oil.

The internal pressure PC of the oil line 14 changes as shown in FIG. 11 during the normal operation of the lubricating oil feeder, given that time T1 represents an interval during which lubricating oil is discharged into the oil line 14 with the check valve 9 being opened. The time T2 is the interval during which no lubricating oil is discharged and the check valve 9 is shut. In other words, PC=PO and PC=PB in the time zones T1 and T2, respectively. The lubricating oil feeder is properly operating as long as the pressure PC is maintained at the above valves. In all other cases, irregularities are considered to be present.

Figure 12:
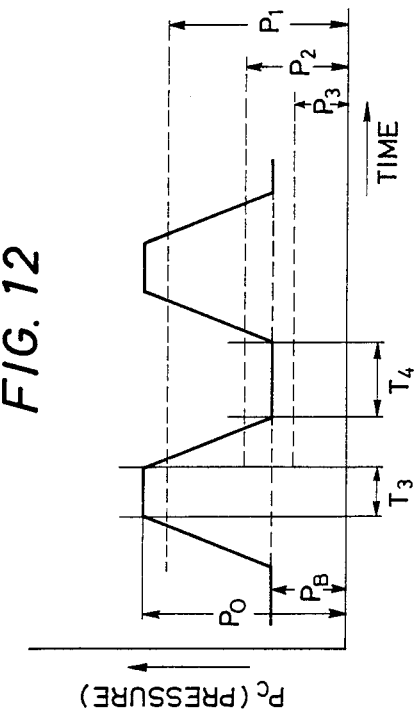

In the embodiment of FIG. 12, the pressures PO and PB during normal operation are given proper allowance in such a manner as to apply a value P1 lower by a specific quantity than the pressure PO (P1<PO), a value P2 higher than PB (P2>PB), and a value P3 lower than PB (P3<PB). The pressure PC is assumed to be constant during the time period T3 that is a portion of the time interval T1 for supplying the air-oil mixture and during the time T4 that is a portion of the period T2 and is a period for supplying only compressed air. When the pressure PC deviates from the set values in the time zones T3, T4, irregularities are assumed to be present.

The internal pressure PC of the oil line 14 during normal operation is shown in FIG. 12. In other words, P1≦PC≦PO in the time zone T3 and P3≦PC≦P2 in the time zone T4.

Table 1 shows the relationship of the internal pressure PC of the oil line 14 resulting from each irregularity.

TABLE 1

| Irregularities: | Detection time zone: | |
| --- | --- | --- |
| | T3 | T4 |
| (1) Damage to branch pipe 6: | | PC < P3 |
| (2) Nozzle is clogged: | | PC > P2 |
| (3) Malfunction of intermittent oil supply/ check valve 9 is choked up: | PC < P1 | |
| (4) Second throttle valve 13 is choked up: | | PC > P2 |

Changes in the internal pressure PC of the oil line 14 are detected by the pressure switches 15a, 15b, and 15c as shown in FIG. 2A.

It has been so arranged in the case of the above embodiment that if $PC \geq P1$ in the time zone T3, the pressure switch 15a will be turned off or on. If $PC \leq P2$ in the time zone T4, the pressure switch 15b will be turned on or off. If $PC \geq P3$, the pressure switch 15c will be turned on or off. In case the pressure PC deviates, as shown in Table 1, from the normal value, the detector 16 will detect the on-off switching action of each pressure switch 15a, 15b, or 15c, and instruct the alarm 17 to issue a warning.

The time zones T3, T4 are set in the detector 16 according to the signal sent out of the controller 4.

Figure 2B:
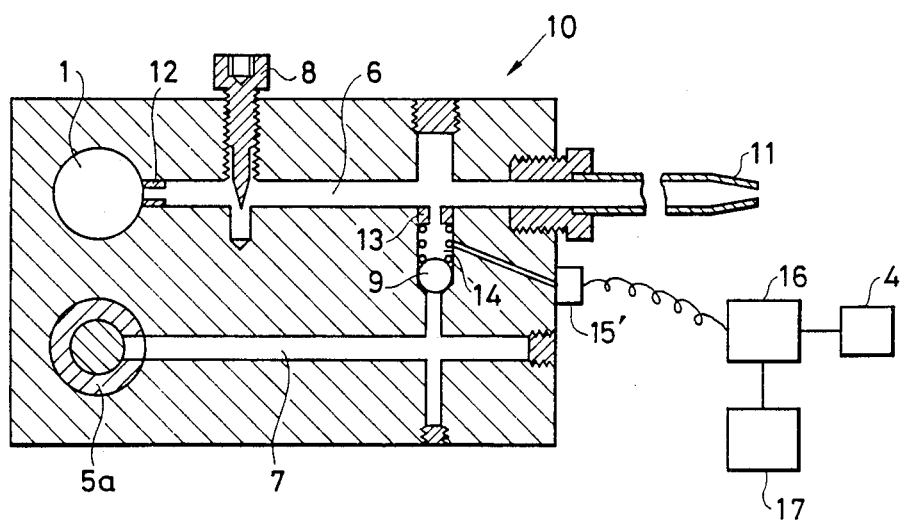
FIG. 2B is a schematic sectional view of a mixer in the detector of FIG. 1.

Although the pressure PC is detected by the pressure switch 15, a pressure sensor 15' may be used to detect the pressure PC and thereby the malfunction of the feeder as a whole as shown in FIG. 2B. The pressure sensor 15' is intended to detect the internal pressure of the oil line 14 and is installed in the detector 16, which is coupled to the controller 4 and the alarm 17. Numeral 18 designates a pressure gauge.

As shown in FIG. 3, a bicontact type pressure switch 15d is installed in the oil line 14 of the mixer 10 in place of the pressure switches 15a, 15b. The pressure switch 15d is turned on within the range of $PC \geq P1$ in the time zone T3 and the range $PC \leq P2$ in the time zone T4. The switch 15d is turned off at $P2 < PC < P1$ for detecting irregularities.

As shown in FIG. 4, a bicontact type pressure switch 15e is installed in the oil line 14 of the mixer in place of the pressure switches 15b, 15c.

The pressure switch 15e detects irregularities in the same manner.

As shown in FIG. 5, a single pressure switch 15f is installed in the oil line 14 of the mixer 10 of the pressure switches 15a, 15b. The switch 15f is turned on within the range of $PC \geq P1$ in the time zone T3 and is turned off within the range of $PC \leq P2$ in the time zone T4 for indicating irregularities when the switches 15f is off in the time zone T3 or on in the time zone T4.

Figure 7:
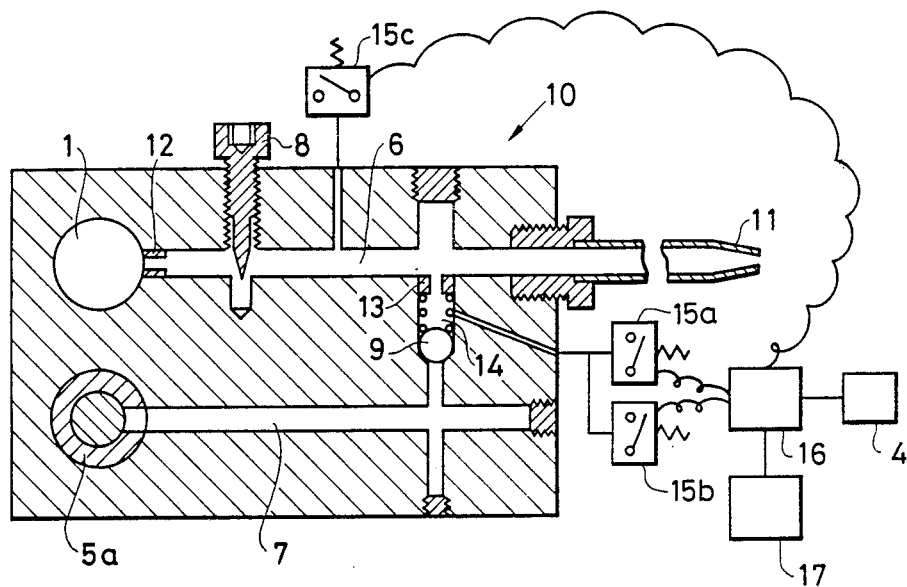
FIG. 7 is a schematic diagram of a mixer usable in the detector of FIG. 6.

In FIGS. 6 and 7, pressure switches 15a, 15b are installed as pressure detecting means for detecting the internal pressure of the oil line 14 and a pressure switch 15c is installed as another pressure detecting means for detecting the internal pressure of the branch pipe 6. The pressure switches 15a, 15b, and 15c are connected to the detector 16 that is also connected to the controller 4 and the alarm 17. Numeral 18 indicates a pressure gauge.

The internal pressure PC of the oil line 14 during the normal operation of the lubricating oil feeder will become $PC = PO$ in the time zone T1 and $PC = PB$ in the time zone T2 as shown in FIG. 11. The operation is thus considered normal as long as the pressure PC is maintained at the above levels and abnormal when it deviates therefrom. In the meantime, the internal pressure of the branch pipe 6 is not affected by the lubricating oil discharged because the quantity of the lubricating oil discharged from the oil line 14 is extremely small and causes no detectable change in the pressure in the branch pipe 6. In other words, the pressure of irregularities in the branch pipe 6 can be detected from fluctuations in the pressure PB alone.

As shown in FIG. 12, the internal pressures PB and PC of the branch pipe 6 and the oil line 14, respectively, during normal operation become $P1 \leq PC \leq PO$ in the time zone T3 and $P3 \leq PB \leq P2$ irrespective of the time zone. The relationship between the internal pressures PB and PC can be used to identify irregularities as shown in Table 2.

TABLE 2

| Irregularities: | Detection time zone: | |
|---|---|---|
| | T3 | T4 |
| (1) Damage to branch pipe 6: | PB < P3 | PB < P3 |
| | | PC < P3 |
| (2) Nozzle is clogged: | PB > P2 | PB > P2 |
| | | PC > P2 |
| (3) Malfunction of intermittent oil supply/check valve 9 is choked up: | PC < P1 | |
| (4) Second throttle valve 13 is choked up: | | PC > P2 |

Changes in the internal pressure PC of the oil line 14 in this embodiment are detected by the pressure switches 15a and 15b. If $PC \geq P1$ in the time zone T3, the pressure switch 15a will be turned off or on and, if $PC \leq P2$ in the time zone T4, the pressure switch 15b will be turned on or off. Changes in the pressure PB are detected by the pressure switch 15c and, if $PB \geq P3$, the pressure switch 15c will be turned off or on. The detector 16 detects the on and off states of each of the pressure switches 15a, 15b, and 15c, and reacts to the pressures PB, PC deviating from the normal values as shown in Table 2, thus instructing the alarm to issue a warning.

Figure 8:
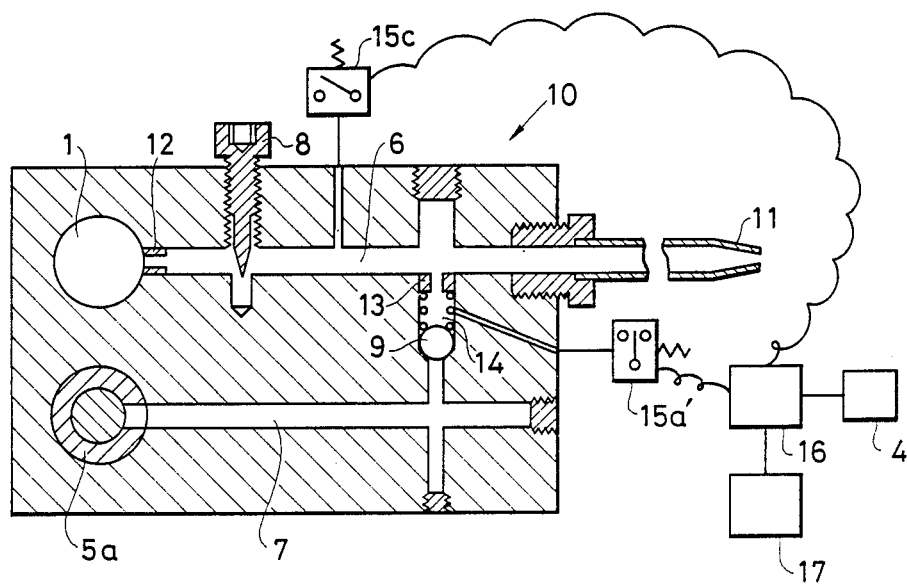
FIGS. 8, 9, 10 are schematic diagrams of other mixers usable in the detector of FIG. 6.

As shown in FIG. 8, a bicontact type pressure switch 15a' is installed in the oil line 14 of the mixer 10 in place of the pressure switches 15a and 15b. Irregularities are detected by causing the pressure switch 15a' to be turned on when $PC > P1$ in the time zone T3 and $PC \leq P2$ in the time zone T4, and to be turned off when $P2 < PC < P1$.

Figure 9:
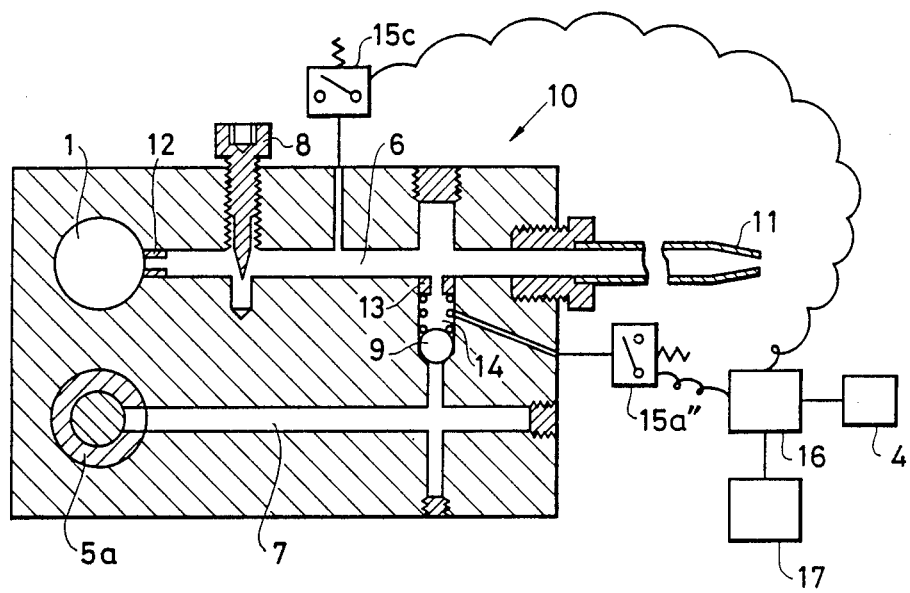

As shown in FIG. 9, a single pressure switch 15a'' is installed in the oil line 14 of the mixer 10 in place of the pressure switches 15a, 15b. The switch 15a'' is turned on when $PC \leq P1$ in the time zone T3 and off when $PC \leq P2$ in the time zone T4. Irregularities are considered to be present when the switch 15a'' is off in the time zone T3 and on in the time zone T4.

Figure 10:
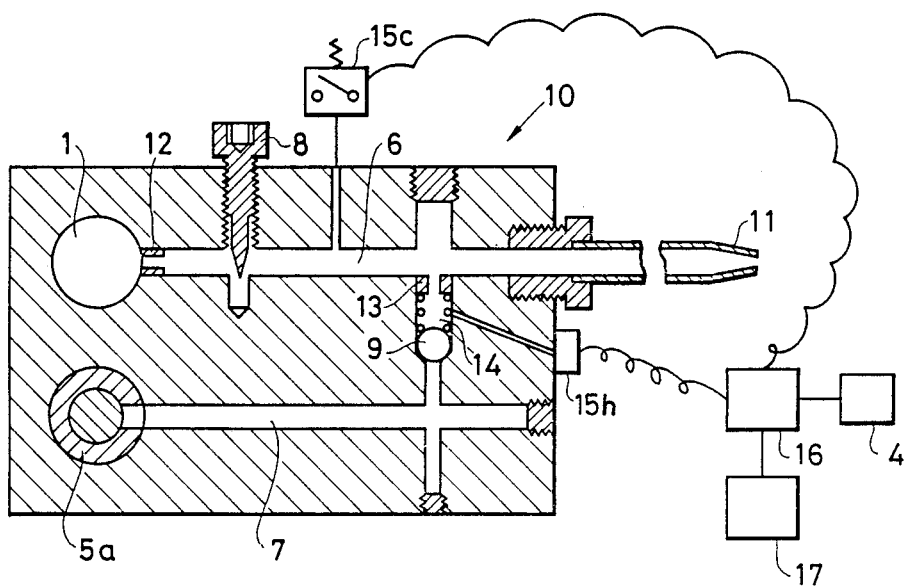
Figure 13:
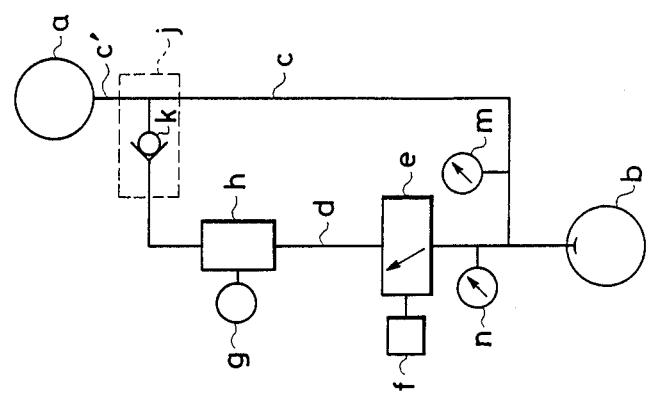
FIG. 13 is a schematic system diagram of a conventional lubricating oil feeder modified to include pressure gauges m and n.

As shown in FIG. 10, a pressure sensor 15h is installed in the oil lie 14 of the mixer 10 in place of the pressure switches 15a, 15b. The internal pressure of the branch pipe 6 is set at lower than that of the air supply pipe 1 and higher than atmospheric pressure by means of the first and third throttle valves 12, 11. The internal pressure of the oil line 14 is set at roughly equal to that of the supply pipe 7 while lubricating oil is being discharged and to that of the branch pipe 6 while it is not. As a result of establishing these conditions, irregularities in the branch pipe 6 and the supply pipe 7 can be detected by only monitoring fluctuations in the internal pressure of the oil line 14 or the branch pipe 6 and the oil line 14.

As such irregularities are detectable by providing pressure detecting means 15 in the individual oil line 14 or the oil line 14 and branch pipe 6 located close to the oil receiving unit B. The irregularities can be detected with great accuracy and the locations can be readily discovered.

Figure 14:
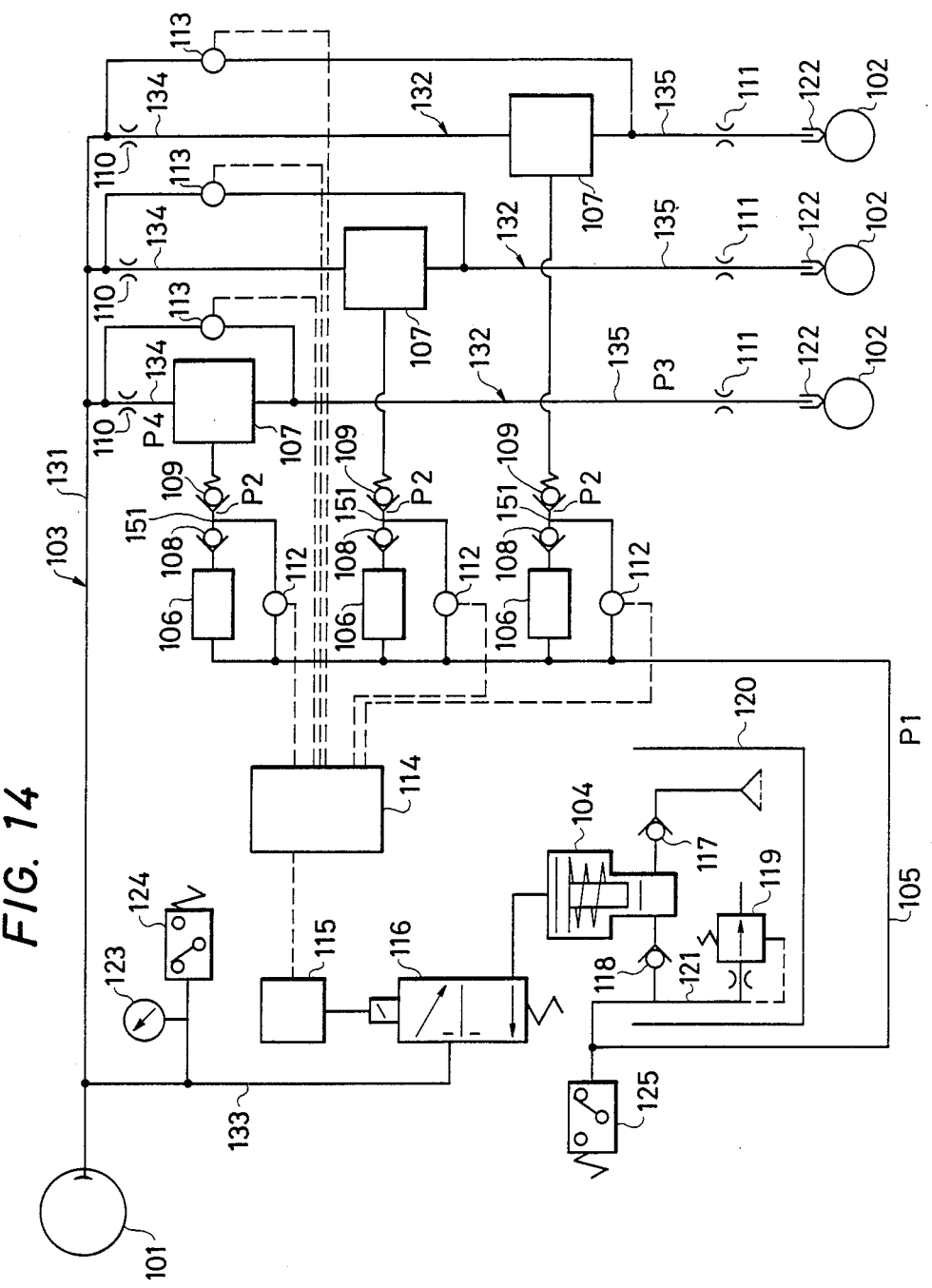
FIG. 14 is a block system diagram of another embodiment of the detector of the present invention.

The embodiment of FIG. 14 includes check valve 109 as a substitute for the throttle and is characterized in that the internal pressures in two places of each oil line are detected by different sensors to determine pressure differences.

As shown in FIG. 14, a pump 101 for generating compressed air is coupled to a main pipe 131 of an air supply pipe 103 and the main pipe 131 branches into a plurality of branch pipes 132 on its downstream side. Each branch pipe 132 communicates with a corresponding oil receiving unit 102.

An oil supply source 104 intermittently discharges lubricating oil and is equipped with a piston pump reciprocally driven by compressed air supplied by another branch pipe 133 of compressed air supply pipe 103. Control of the driven pump is conducted by a solenoid valve 116 whose on-off operation is controlled by control means 115 such as a timer. Lubricating oil is supplied to an oil supply pipe 105 as the piston is reciprocally moved by means of check valves 117, 118 installed in the preceding and following stages of the pump.

A depressurizing device 119 is used to cause all of the pumped oil to flow through the oil supply pipe 105 by making use of the raised internal pressure P1 of the oil supply pipe 105 for shutting an oil tank 120 from a return line 121 while the lubricating oil is being discharged from the oil supply source 104. The remaining internal pressure of the oil supply pipe 105 can be dissipated by let the return line 121 communicating with the oil tank 120. The internal pressure P1 of the oil supply pipe 105 is made equal to atmospheric pressure when no lubricating oil is being discharged from the oil supply source 104. The quantity of the oil discharged from the oil supply source 104 can thus be kept constant by dissipating the remaining internal pressure of the oil supply pipe 105.

Each quantitative oil discharger 106 discharges a small fixed quantity of oil supplied by the intermittent oil supply source 104 through an oil supply pipe 105 and supplies the oil to an air-oil mixer 107 through a check valve 108, and oil supply line 151, and a check valve 109.

The air-oil mixer 107 supplies the oil discharged from the corresponding quantitative oil discharger 106 into the compressed air current in the branch pipe 132 and causes the oil to be carried toward the oil receiving unit 102 with the aid of the compressed air current to supply oil and air simultaneously thereto. A nozzle 122 is fitted to the end of each branch pipe 132 to direct the oil-air mixture to the oil receiving unit 102.

The check valve 108 prevents the oil from flowing backward from the air-oil mixer 107 to the quantitative oil discharger 106, whereas the check valve 109 is provided with an aperture area and spring force regulated so that it may open and shut when increases and decreases in the pressure of the lubricating oil discharged from the check valve 108 have reached given values.

A throttle 110 is installed in each oil line 134 on the upstream side of the air-oil mixer 107 and a throttle 111 is installed in each oil line 135 on the downstream side thereof. Given an internal pressure P3 of the oil line on the throttle side of the throttle 111, an internal pressure P4 of the oil line on the downstream side of the throttle 110, and the atmospheric pressure P0, the relation between the pressures is set at $P0 < P3 < P4$.

The pressure P3 on the upstream side of the throttle 111 is almost completely unaffected by pressure fluctuations caused by lubricating oil injection since the quantity of lubricating oil injected by the quantitative oil discharger 106 into the air-oil mixer 107 is small. The nozzle 122 may be so arranged as to serve as the throttle 111 because the nozzle 122 has a throttling function.

A pressure sensor 112 is used to detect the difference between the pressure P2 produced in each of the oil supply lines 151 connecting the check valves 108, 109 and the internal pressure P1 of the oil supply line 151. A pressure sensor 113 is employed to detect the difference between the internal pressure P4 of each oil line on the upstream side of the throttle 110 and the pressure P3 of the same oil line on the upstream side of the throttle 111.

Detecting means 115 is used to detect a malfunction of the lubricating oil feeder when the pressures detected by the pressure sensors 112, 113 have deviated from set values.

Figure 15:
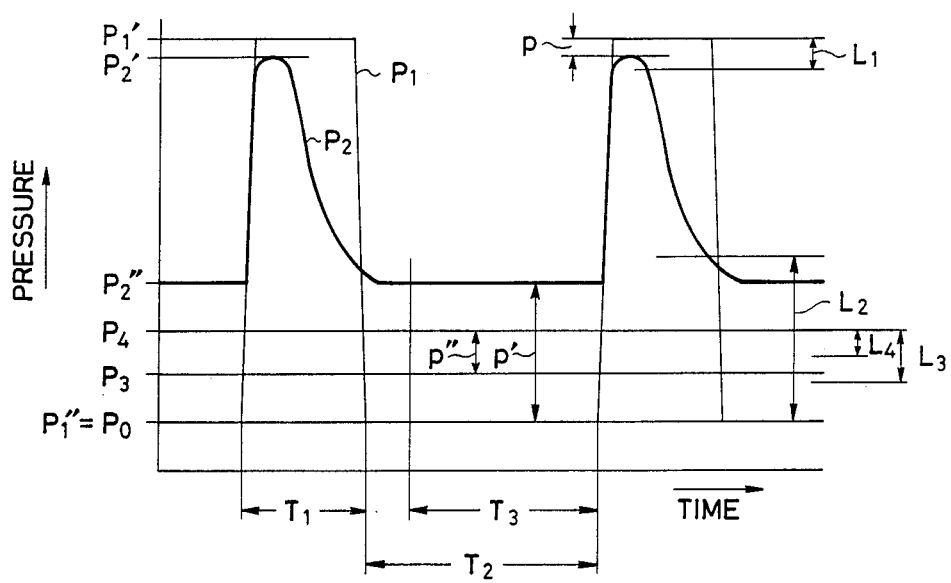
FIGS. 15 and 16 are timing diagrams for explaining the operation of the detector of FIG. 14.

FIG. 15 is a graph illustrating the fluctuations of the pressures P1, P2, P3 and P4 during the normal operation of the feeder. The internal pressure P1 of the oil supply pipe 105 shows a maximum pressure P1' while oil is being discharged from the intermittent oil supply source 104 (time T1) and a pressure P1" equal to the atmospheric pressure when oil is not being discharged (time T2).

The pressure P2 is controlled so that it may be set within the range determined by the predetermined aperture area and spring pressure of the check valve 109 and it will rise up to a pressure P2' (roughly approximating the maximum pressure P1') when the lubricating oil is discharged from the oil supply source 104. Consequently, the check valve 109 opens, whereby the lubricating oil is supplied to the air-oil mixer 107. The pressure P2 decreases to a pressure P2" when the check valve 109 opens.

When the intermittent oil supply source 104 stops discharging the oil, the check valve 109 shuts and, since the check valve 108 prevents the oil from flowing backward, the pressure P2" (P2" > P1") is maintained.

The following four irregularities in the lubricating oil feeder are considered possible and will be discussed. First, a fixed quantity of lubricating oil is not discharged because the quantitative oil discharger 106 malfunctions. In that case, the pressure P2 in the time zone T1 will not rise even if the oil is discharged from the intermittent oil supply source 104 and the maximum level of the pressure P2' will drop to a pressure PA shown in FIG. 16 (P2≃PA).

Figure 16:
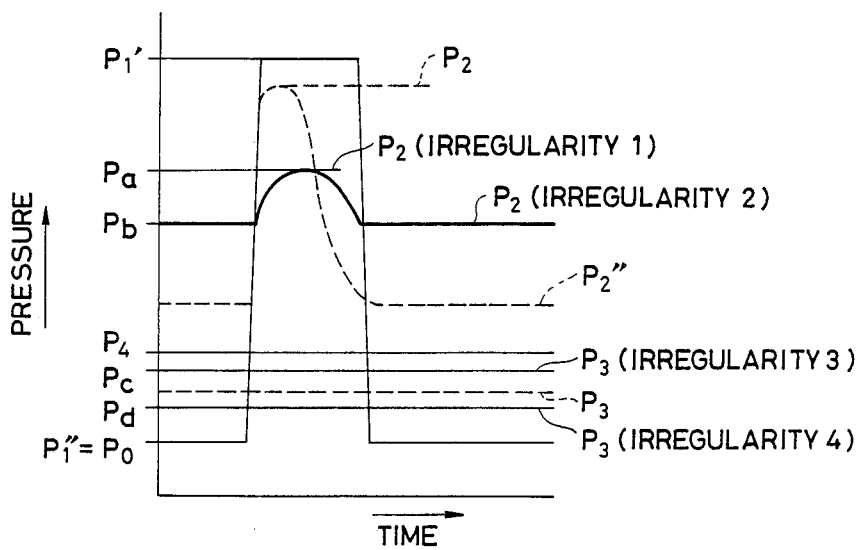

A second irregularity occurs if the oil line is clogged at a place between the quantitative oil discharger 106 and the air-oil mixer 107 and no oil is discharged into the air-oil mixer 107. Then the pressure P2 will not drop substantially even if no oil is discharged from the intermittent oil supply source 104 and the pressure P2 in the time zone T2 will equal a pressure PB as shown in FIG. 16.

A third irregularity occurs if the branch pipe is clogged at a place between the air-oil mixer 107 and the oil receiving unit 102 and a fixed quantity of air is not supplied to the oil receiving unit 102. In that case, the pressure P3 will approximate a pressure Pc shown in FIG. 16.

The fourth irregularity occurs if the branch pipe is broken at a place between the air-oil mixer 107 and the oil receiving unit 102 and air leakage therethrough makes a fixed quantity of air unavailable at the oil receiving unit. In that case, the pressure P3 will drop to a pressure Pd shown in FIG. 16.

The pressure sensor 112 detects fluctuations in the pressure P2 in the time zones T1, T2 the differences p, p' for the pressures P1 and P2 during normal operation. The pressure sensor 113 detects the fluctuation in the pressure P3 as the difference p' between the pressures P4 and P3 during normal operations. The values of the pressure differences p, p' and p' during normal operation are set at detecting means 114 as reference pressures for judging the presence of irregularities. By synchronizing the detected pressures and the reference pressures as criteria for ascertaining the presence of irregularities within the time zones T1, T2 for comparison purposes, the malfunctions of the feeders can be detected.

The synchonization of the time zones T1, T2 for ascertaining the presence of irregularities can be implemented by, for instance, interlocking with a timer the control means 115 and the detecting means 114.

The reference pressures for ascertaining the presence of irregularities can be set at levels within a range. In other words, the reference pressure difference P is set within a range L1 slightly wider than the actual pressure difference P during normal operation when the intermittent oil supply source 104 is discharging the lubricating oil (time T1), relative to the fluctuations in the pressure differences p, p' between the pressures P1 and P2. The reference pressure may be set within a range L2 slightly wider than the pressure difference p' during normal operation in the time zone T3 wherein the pressure difference becomes roughly constant when the intermittent oil supply source 104 is not discharging the lubricating oil.

The reference pressure may also be set at a range L3 slightly wider or a range L4 slightly narrower than the pressure difference p' during operation, relative to the fluctuations in the difference between the pressures P4 and P3.

Figure 17:
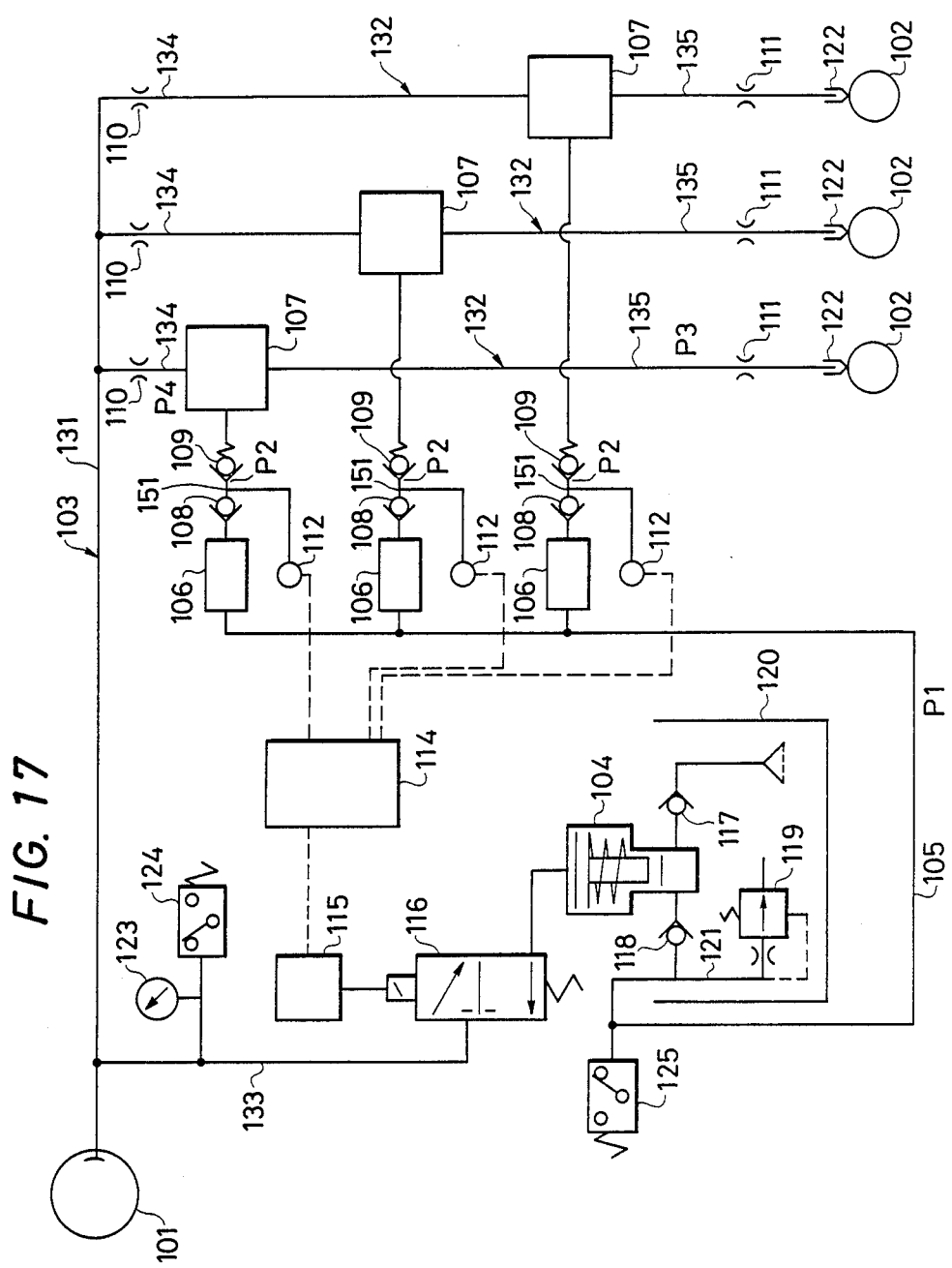
FIG. 17 is a block system diagram of another embodiment of the detector of the present invention.

FIG. 17 shows the construction of another emdoiment of the present invention wherein like reference numbers designate like or corresponding members of those illustrated in the embodiment of FIG. 14. The description of corresponding elements will be omitted.

The pressure sensor 112 according to this embodiment detects the difference between atmospheric pressure P0 and the pressure P2 generated in each oil supply line 151 connecting the check valves 108, 109. Detecting means 114 detects the malfunction of a lubricating oil feeder when the pressure detected by the pressure sensor 112 has deviated from a set value or range of valves.

Figure 18:
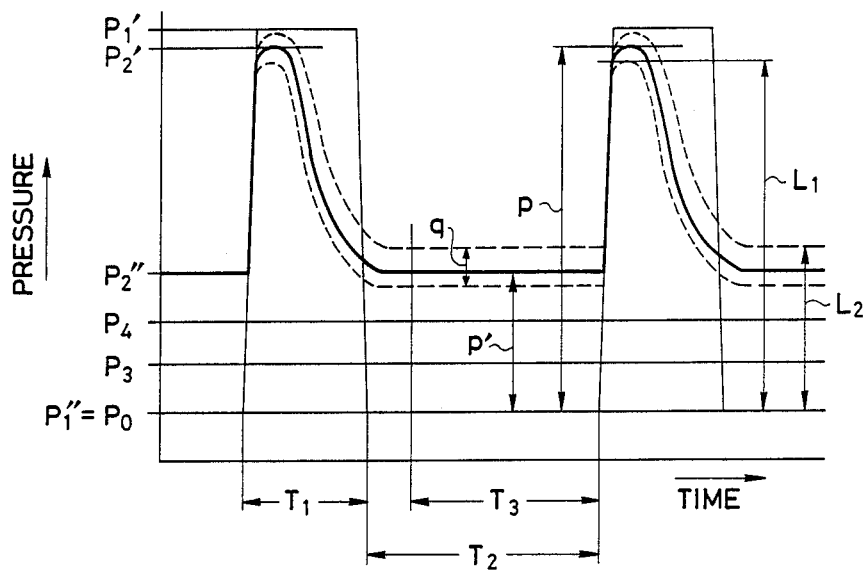
FIGS. 18 and 19 are timing diagrams for explaining the operation of the detector of FIG. 17.

FIG. 18 is a graph illustrating changes in the pressures P1, P2, P3, and P4 and during the operation of the oil feeder in the context wherein the following four irregularities in this lubricating oil feeder are considered possible.

The first irregularity occurs if a fixed quantity of lubricating oil is not discharged because the quantitative oil discharger 106 malfunctions. In that case, the pressure P2 in the time zone T1 will not rise even if the oil is discharged from the intermittent oil supply source 104 and the pressure P2' will approximate a pressure PA shown in FIG. 19 (P2≃PA).

The second irregularity occurs if the oil line is clogged at a place between the quantitative oil discharger 106 and the air-oil mixer 107 and no oil is discharged into the air-oil mixer 107. Then the pressure P2 will not drop even if no oil is discharged from the intermittent oil supply source 104.

Figure 19:
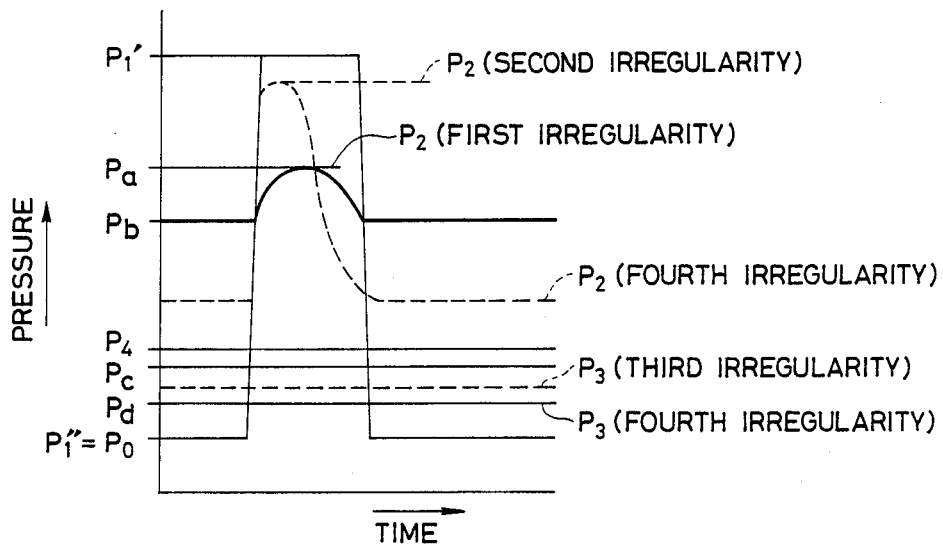

The third irregularity occurs when the branch pipe is clogged at a place between the air-oil mixer 107 and the oil receiving unit 102 and a fixed quantity of air is not supplied to the oil receiving unit 102. In that case, the pressure P3 will remain below the pressure PC, as shown in FIG. 19.

In the fourth irregularity, the branch pipe is broken at a place between the air-oil mixer 107 and the oil receiving unit 102 and air leakage therethrough makes a fixed quantity of air unavailable at the oil receiving unit. In that case, the pressure P3 will drop to a pressure PD shown in FIG. 19 and simultaneously P2'' of the pressure P2 in the time zone T2 will fall below PB as shown in FIG. 19.

In other words, the pressure sensor 112 detects repsective fluctuations in the pressure P2 in the time zones T1, T2 the differences p, p' , respectively, between the pressure P2 and the atmospheric pressure P0. The pressure differences p, p' during normal operation are set at the detecting means 14 as reference pressure for determining the occurrence of irregularities and for comparing the detected pressures and the reference pressures during the time zones T1 and T2. In this manner, malfunctions of the feeder can be detected.

The embodiment of FIG. 17 can be further modified such that the pressure sensor 112 is used to detect the difference between the pressure P2 generated in each oil supply line 151 and the internal pressure P1 of the supply pipe 105. Detecting means 114 operates so as to detect the malfunction of a lubricating oil feeder when the pressure detected by the pressure sensor 112 has deviated from a set value.

It should be understood that the present invention is not limited to the particular embodiment described, but rather is susceptible to modifications, alteration, and equivalent arrangements within the scope of the appended claims.

What is claimed is:

1. In a lubricating oil feeder for supplying a mixture of oil and air to lubricate an oil receiving unit, wherein the lubricating oil feeder includes a source of compressed air, an air supply pipe for providing the compressed air to the oil receiving unit, an oil supply source for intermittently discharging lubricating oil, a quantitative oil injection device for intermittently injecting a fixed quantity of oil supplied by the intermittent oil supply source through an oil supply pipe, and a mixing valve for mixing the oil discharged from the oil injection device with the current of compressed air in the air supply pipe for supply of the mixture to the oil receiving unit, a detector for detecting the malfunction of the lubricating oil feeder comprising:

a first check valve for preventing the back flow of the oil from the mixing valve to the oil injection device;

first pressure regulating means for regulating the pressure of the oil discharged from said first check valve, said first check valve and said first pressure regulating means being installed between the oil injection device and the mixing valve;

second pressure regulating means between the air supply pipe and the mixing valve;

third pressure regulating means installed between the mixing valve and the oil receiving unit; and pressure irregularity detector means for comparing the pressure levels of the oil as established by said first, second, and third pressure regulating means to predetermined values, to detect abnormal operation in the oil feeder.

2. A detector according to claim 1, wherein said first pressure regulating means comprises a second check valve opening and closing in response to the pressure of the oil discharged from said first check valve to regulate the pressure of the oil supplied to the mixing valve.

3. A detector according to claim 1, wherein said first pressure regulating means comprises a throttle for regulating the pressure of the oil discharged from said first check valve and supplied to the mixing valve.

4. A detector according to claim 1, wherein said second and third pressure regulating means comprise throttles.

5. An oil supply malfunction detector for use in a lubricating oil feeder for supplying a mixture of oil and air to lubricate an oil receiving unit wherein the feeder includes a source of compressed air, an air supply pipe connected to the source, an air supply source for intermittently discharging lubricating oil, an oil injection device for receiving the oil and for intermittently discharging a fixed quantity of oil to an oil supply pipe, a mixing valve connected to the air supply pipe and the oil supply pipe to mix the compressed air and oil, and an oil receiving unit connected to the mixing valve for receiving the mixture of air and oil, the detector comprising:

a first pressure detector for generating a first signal having a value corresponding to the difference in pressure between the oil discharged by the oil injection device and the oil supplied by said oil supply means;

a second pressure detector for generating a second signal having a value corresponding to the air pressure between the source of compressed air and the mixing valve;

a third pressure detector for generating a third signal having a value corresponding to the pressure of the mixture of air and oil supplied to the oil receiving unit; and an error detector device for comparing the values of said first, second, and third signals to predetermined normal values and for indicating the existence and location of a malfunction in said oil feeder in response to a difference in said compared signals exceeding a preselected range of difference.

6. An oil supply malfunction detector according to claim 5, wherein said first pressure detector generates said first signal with a value corresponding to the difference between the pressure of the oil discharged by the oil injection device and atmospheric pressure.

* * * * *